US008256840B2

(12) United States Patent
Dasent et al.

(10) Patent No.: US 8,256,840 B2
(45) Date of Patent: Sep. 4, 2012

(54) APPARATUS AND METHOD FOR ATTACHING A CHILD SAFETY SEAT TO A VEHICLE SEAT

(75) Inventors: Marlon George Inskip Dasent, Charlotte, NC (US); Scott Alan Reed, York, SC (US)

(73) Assignee: Britax Child Safety, Inc., Charlotte, NC (US)

( * ) Notice: Subject to any disclaimer, the term of this patent is extended or adjusted under 35 U.S.C. 154(b) by 168 days.

(21) Appl. No.: 12/813,346

(22) Filed: Jun. 10, 2010

(65) Prior Publication Data

US 2011/0304180 A1 Dec. 15, 2011

(51) Int. Cl.
*A47D 1/10* (2006.01)
(52) U.S. Cl. .................. 297/253; 297/256.16
(58) Field of Classification Search .................. 297/253, 297/254, 256.16
See application file for complete search history.

(56) References Cited

U.S. PATENT DOCUMENTS

| | | | | |
|---|---|---|---|---|
| 6,000,753 | A * | 12/1999 | Cone, II | 297/256.16 |
| 6,592,183 | B2 * | 7/2003 | Kain | 297/253 |
| 6,863,345 | B2 * | 3/2005 | Kain | 297/256.16 |
| 7,216,932 | B2 * | 5/2007 | Emmert | 297/256.16 |
| 7,926,874 | B2 * | 4/2011 | Hendry | 297/256.16 |
| 7,988,230 | B2 * | 8/2011 | Heisey et al. | 297/256.16 X |
| 8,141,950 | B2 * | 3/2012 | Boyer | 297/253 X |
| 2010/0019557 | A1 * | 1/2010 | Longenecker et al. | 297/253 |
| 2010/0253121 | A1 * | 10/2010 | Buckingham et al. | 297/253 |
| 2011/0272985 | A1 * | 11/2011 | Fritz et al. | 297/253 |

OTHER PUBLICATIONS

*Chicco* Key Fit 30 Infant Car Seat; 2 pages; available at <http://www.elitecarseats.com/Chicco-Key-Fit-30.pro>; (visited Jun. 1, 2010).
Clek Olli Booster Car Seat with Latch; 1 page; available at <http://www.toysrus.com/product/index>; (visited Jun. 1, 2010).
Clek™ Oobr™; 1 page; available at <http://www.magnaclek.com/us/english/default.aspx>; (visited Jun. 1, 2010).
Sunshine Kids Monterey Booster Seat; 2 pages; available at <http://www.elitecarseats.com/Sunshine-Kids-Monterey.pro> (visited Jun. 1, 2010).

* cited by examiner

*Primary Examiner* — Rodney B White
(74) *Attorney, Agent, or Firm* — Alston & Bird LLP

(57) ABSTRACT

The present disclosure is directed to child safety seats, and in particular, an apparatus and method for securing child safety seats within a vehicle. Embodiments may provide a safety seat that includes a base defining a cavity therein. The safety seat may further include a first strap and a second strap where the first strap and the second strap each include a pulling end and an attachment end. The safety seat may also include a balancer assembly disposed within the cavity where each of the first and second straps pass through the balancer assembly, and where a pulling force applied to the pulling end of either of the first strap or the second strap results in a force on the attachment ends of both of the first and second strap that is substantially equal.

20 Claims, 10 Drawing Sheets

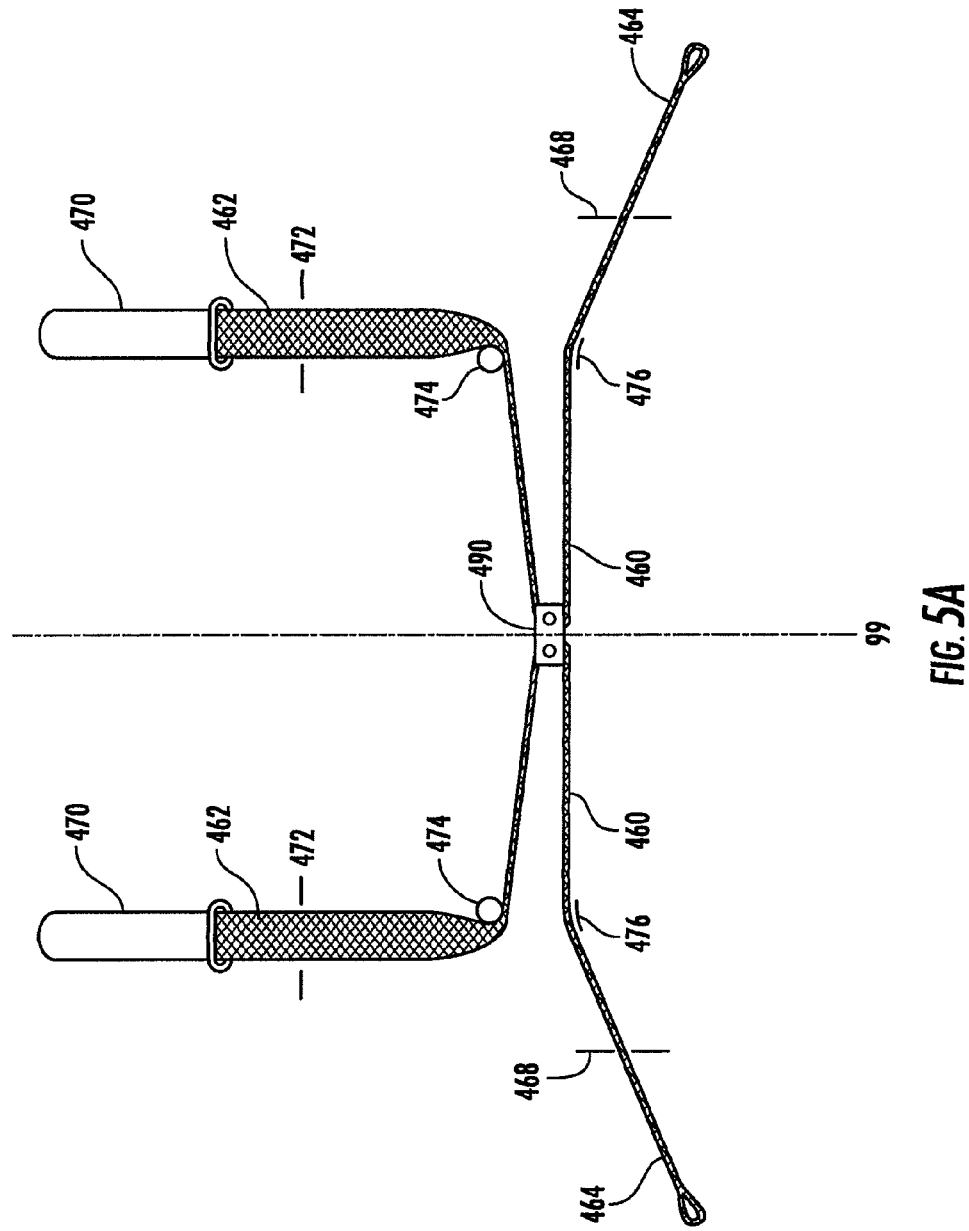

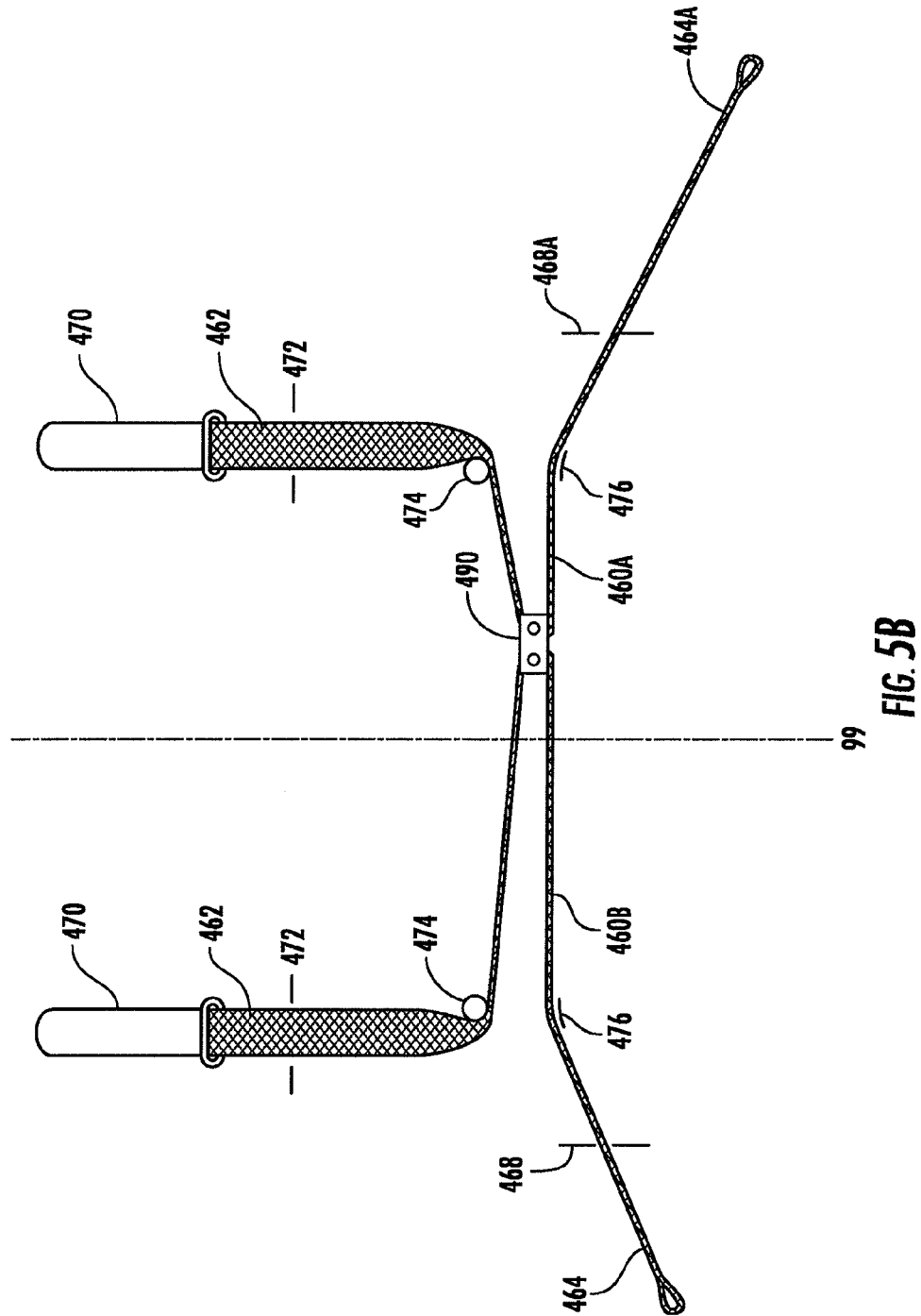

APPARATUS AND METHOD FOR ATTACHING A CHILD SAFETY SEAT TO A VEHICLE SEAT

TECHNOLOGICAL FIELD

The present invention relates to child safety seats used in vehicles to protect children and, more particularly, to a method of securing a child safety seat to anchor points in a vehicle using attachment straps.

BACKGROUND

Child safety seats are designed to protect children in vehicles from the effects of impacts or other sudden changes in motion. Child safety seats, commonly referred to simply as car seats, may be embodied in a number of different forms and be used in a variety of vehicles with a variety of seating configurations. It is important for a child safety seat to securely retain an occupant and limit movement of that occupant, particularly during an impact.

Some child safety seats are configured to securely attach to a vehicle seat either by use of the vehicle seat belt or by use of anchor points within the vehicle and connectors attached to the child safety seat, such as LATCH (lower anchors and tethers for children) anchor points and connectors. These child safety seats may include a separate harness to secure an occupant to the child safety seat while the vehicle seat belt or the LATCH system secures the child safety seat to the vehicle. Other child safety seats, and in particular some seat belt positioning booster seats are unsecured to the vehicle seat, but once an occupant is in the booster seat, the vehicle seat belt is used to secure both the occupant and the booster seat to the vehicle seat.

Vehicle seat-belts are designed to comfortably accommodate occupants up to full-size adults. A seat belt designed to accommodate and protect a six-foot adult may not provide adequate protection for a child. As such, seat belt positioning booster seats are designed to re-position a vehicle seat belt to more appropriately accommodate children, often from around 30 inches tall and 30 lbs until they can be adequately protected by the use of a vehicle seat belt without the belt-positioning booster. As belt-positioning boosters use the vehicle seat belt for securing an occupant of the booster to the vehicle, the booster seat itself may not need to be secured to the vehicle. However, it may be desirable to secure a belt-positioning booster and/or a booster seat base to a vehicle such that the booster seat is not unintentionally moved while unoccupied or when an occupant is entering or exiting the booster seat.

Securing child safety seats within a vehicle may be an important factor in ensuring the performance and intended function of the safety seat is optimized. Cumbersome attachment mechanisms or confusing attachment steps may reduce the likelihood of a child safety seat being properly installed and secured within a vehicle. It may be desirable to have an easier, less cumbersome attachment means for securing various embodiments of child safety seats within a vehicle.

BRIEF SUMMARY

Various embodiments of the present invention are directed to child safety seats, and in particular, an apparatus and method for securing child safety seats within a vehicle. Embodiments of the present invention may include a safety seat configured with connectors arranged to secure the seat within a vehicle. The connectors may be attached to adjustable straps that extend through the base of the child safety seat and out through locking members. The attachment straps may be tightened, thereby securing the child safety seat to the vehicle by pulling on one or both of the pulling ends of the attachment straps that exit the base through the locking members.

Embodiments of the present invention may provide a safety seat that includes a base defining a cavity therein. The safety seat may further include a first strap and a second strap where the first strap and the second strap each include a pulling end and an attachment end. The safety seat may also include a balancer assembly disposed within the cavity where each of the first and second straps pass through the balancer assembly, and where a pulling force applied to the pulling end of either of the first strap or the second strap results in a force on the attachment ends of both of the first and second strap that is substantially equal. The base may include a front, a back, and two opposing sides disposed therebetween, where the attachment ends of both the first strap and the second strap exit the base proximate the back. The pulling ends of each of the first strap and the second strap may exit the base through the opposing sides. The safety seat may further include first and second locking members disposed proximate the location where the first strap and the second strap exit the base respectively. The first and second locking members may each define a locked position and an unlocked position. In the locked position, the first and second straps may be pulled through the locking members by a pulling force applied to the pulling end of the first and second straps, and wherein the straps are prevented from being pulled through the locking members by a pulling force applied to the attachment ends of the first and second straps. When either of the first or second locking members is in the unlocked position, the first or second strap may be pulled through the respective locking member by a pulling force applied to either the pulling end of the respective strap or either of the attachment ends. Each of the first and second locking members may be biased in the locked position and each of the locking members may be configured to be moved to the unlocked position in response to the actuation of a release mechanism of the respective locking member. The attachment ends of each of the first and second straps may be configured with a connector configured to attach to an anchor point on a vehicle. When a first pulling force is applied to the pulling end of the first strap and a second pulling force is applied to the pulling end of the second strap, the force applied to the attachment ends of both of the first and second strap is substantially equal to the greater of the first pulling force and the second pulling force.

Another embodiment of the present invention may include a safety seat comprising first and second straps, each including a pulling end and an attachment end, where a connector is attached to each attachment end, each connector configured to attach to an anchor point in a vehicle. The safety seat may also include a base through which the first and second straps pass, where the pulling ends of each of the first and second straps extend beyond the base and wherein the attachment ends of each of the first and second straps extend beyond the base. The safety seat may further include a balancer assembly disposed within the base, through which both of the first and second straps pass, where in response to a pulling end of either of the first strap or the second strap being drawn out of the base, the attachment ends of both of the first and second strap are drawn into the base. The base may include a front, a back, and two opposing sides disposed therebetween, where the attachment ends of both the first strap and the second strap exit from the base proximate the back. The pulling ends of the first and the second strap may exit the base through the opposing sides respectively. The safety seat may further include locking members disposed proximate the location where the first strap and the second strap exit the base. The first and second locking members may each define a locked position and an unlocked position, where in the locked position, the first and second straps may be pulled through the locking members by a pulling force applied to the pulling end of the first and second straps, and where the straps are prevented from being pulled through the locking members by a pulling force applied to the attachment ends of each of the straps. When the first or second locking member is in the unlocked position, the respective first or second strap may be pulled through the respective locking member by a pulling force applied to the respective pulling end or either of the attachment ends. The safety seat may further include storage means disposed within the base configured to accept the first and second connectors when the first and second connectors are not attached to anchor points on a vehicle.

Embodiments of the present invention may provide a method for securing a safety seat to a vehicle including attaching connectors of attachment ends of attachment straps to anchor points on the vehicle, where each attachment strap comprises a pulling end and an attachment end. The method may also include pulling at least one of the pulling ends of the attachment straps with a pulling force. The method may also include balancing the tension force across the attachment ends such that each of the attachment ends has substantially equal tension force. The balancing may be achieved with a balancing assembly. Tension may be maintained in the attachment straps with locking members configured to engage each attachment strap respectively, proximate the pulling end.

BRIEF DESCRIPTION OF SEVERAL VIEWS OF THE DRAWING(S)

Reference will now be made to the accompanying drawings, which are not necessarily drawn to scale, and wherein:

FIG. 5A is an illustration of the strap-path of an attachment system for securing a child safety seat to a vehicle according to an example embodiment of the present invention;

FIG. 5B is another illustration of the strap path of an attachment system for securing a child safety seat to a vehicle according to the example embodiment of the present invention;

DETAILED DESCRIPTION

The present invention will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The terms top, bottom, side, up, down, upwards, downwards, vertical, horizontal, and the like as used below do not imply a required limitation in all embodiments of the present invention but rather are used herein to help describe relative direction or orientation in the example embodiments illustrated in the figures. The drawings omit illustration of certain energy absorbing materials, padding, fabric, and other coverings to facilitate ease of visibility and understanding of features of the invention.

Various embodiments of the present invention provide an attachment system for securing a child safety seat to a vehicle. The child safety seat may be embodied as an infant carrier coupled to a base, a convertible child safety seat configured for forward and/or rearward facing installations, a belt-positioning booster seat, or a backless booster seat. The attachment means described herein may be used as a primary coupling mechanism, wherein the child safety seat is secured to the vehicle via anchor points and the child is secured to the seat by a harness attached to the child safety seat. Alternatively, the attachment means may be used as a secondary coupling mechanism wherein the child safety seat is secured to the vehicle via anchor points in the vehicle and the child is secured to the child safety seat, and consequently the vehicle seat, by the vehicle seat belt. When the attachment means is a primary coupling mechanism, the attachment means serves to secure the safety seat and the child to the vehicle seat and provides the necessary restraining force during a vehicle impact to hold the child safety seat and the occupant in position. When the attachment means is a secondary coupling mechanism, the attachment means serves to secure the child safety seat to the vehicle while the vehicle seat belt provides the necessary restraining force to secure the child safety seat and an occupant of the child safety seat in place during a vehicle impact.

Figure 1:
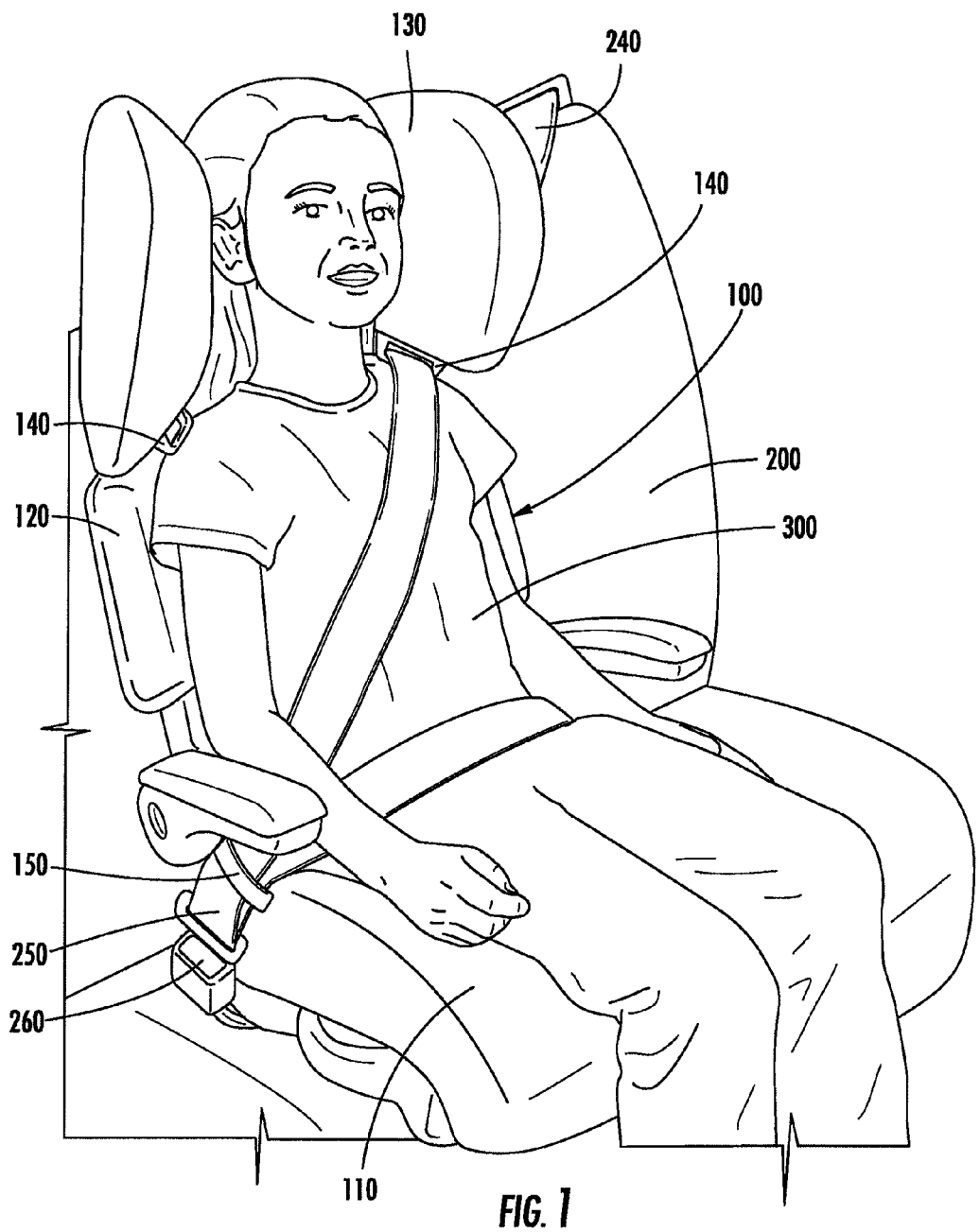
FIG. 1 illustrates a seat belt positioning booster embodiment of a child safety seat as installed in a vehicle according to an example embodiment of the present invention.

FIG. 1 depicts a belt positioning booster seat 100 embodiment of a child safety seat occupied by a child 300 and secured to a vehicle seat 200. The booster seat 100 may include a base portion 110 and a back portion 120 including a head rest portion 130. The back portion 120 may be removable to properly accommodate larger occupants. The booster seat 100 may be configured with shoulder belt guides 140 and lap belt guides 150. The vehicle seat belt may include a shoulder belt 240, a lap belt 250, and a buckle 260. The shoulder belt guides 140 may be configured to position and guide the shoulder belt 240 properly across the torso of a smaller occupant 300, such as a child. Similarly, the lap belt guides 150 may be configured to position and guide the lap belt 250 properly across the lap of a smaller occupant 300. When the seat belt buckle 260 is properly secured, the occupant 300 of the booster seat 100 and the booster seat 100 itself may be properly secured to the vehicle seat 200 for protection during a vehicle impact. When the occupant 300 is large enough that the shoulder belt guides 140 are no longer necessary for proper positioning of the seatbelt for occupant protection, the back portion 120 may be removable such that the base portion 110 may be used independently to properly position an occupant 300 in the vehicle seat 200 to increase the protection afforded by the vehicle seat belt.

Figure 2:
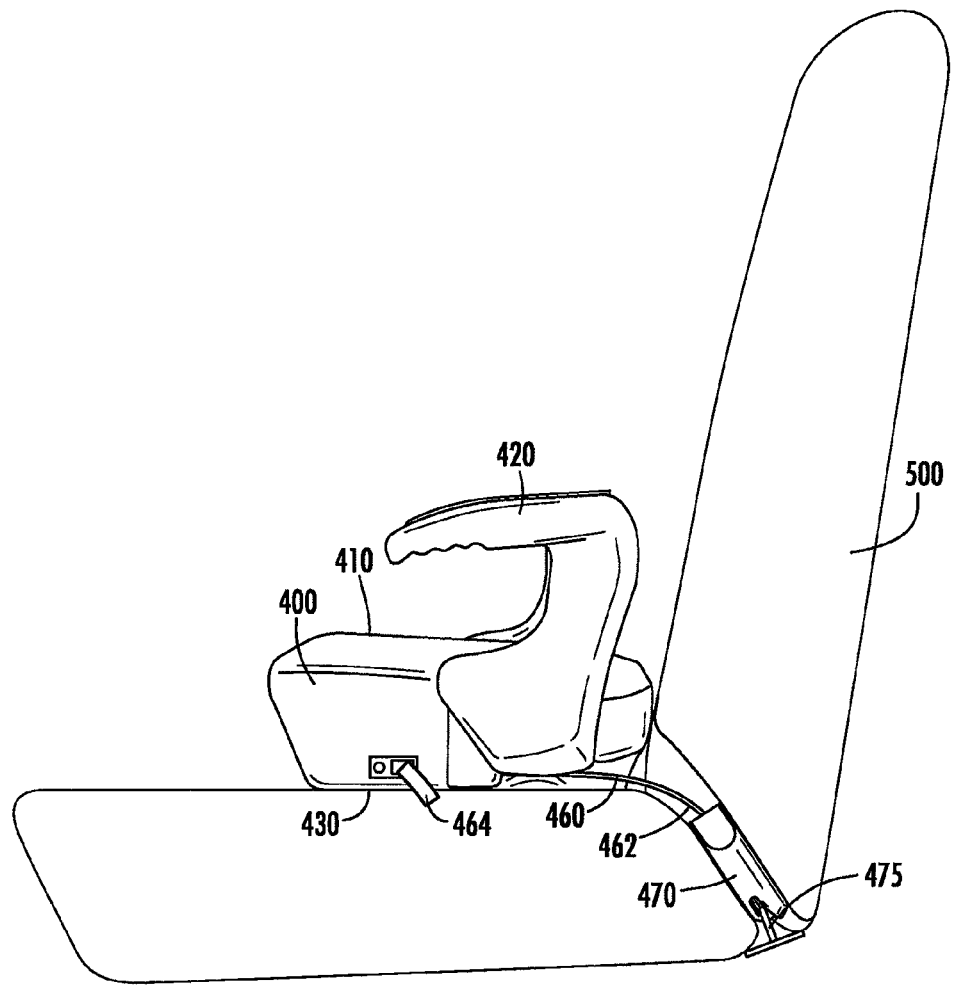
FIG. 2 illustrates a booster seat base embodiment of a child safety seat as installed on a vehicle seat according to an example embodiment of the present invention.

FIG. 2 depicts a side view of an example embodiment of the base of a booster seat 400 as attached to a vehicle seat 500. The side view illustrated is substantially a mirror image of the opposite side such that references herein are made to like elements on both sides of the safety seat. As noted above, booster seats may include a back portion which may or may not be removable. In the illustrated embodiment of FIG. 2, the back portion has been omitted. The booster seat 400 may include a seating surface 410, armrests 420, and a bottom surface 430 which rests on the vehicle seat 500. The booster seat base may further include attachment means for securing the booster seat 400 to the vehicle seat 500. The depicted attachment means include a strap 460 with an attachment end 462 extending from the back of the booster seat 400 and a pulling ends 464 extending from the sides of the booster seat 400. The attachment ends 462 may include connectors 470 such as LATCH (Lower Anchors and Tethers for Children) connectors for securing to LATCH anchors 475 within a vehicle or an ISOFix system. LATCH attachment points have been standard on vehicles manufactured after Sep. 1, 2002, for sale in the U.S. and are intended to accommodate all child safety seats sold in the U.S. The LATCH attachment points typically include a metal anchor that is securely and permanently fastened to a structural member of the vehicle thereby providing a secure anchor point for attachment of the safety seat.

Installation of the booster seat 400 illustrated in FIG. 2 may include loosening the attachment ends 462 of the straps 460 by drawing the attachment ends 462 of the strap out of the back of the booster seat 400 which may require the unlocking of the straps as will be further explained below. The booster seat 400 may then be placed on a vehicle seat 500 with the back of the booster seat 400 facing the seat back. The connectors 470 may then be attached to the vehicle anchors 475. Either or both of the pulling ends 464 of the straps 460 may then be pulled to draw the attachment ends 462 of the straps 460 into the booster seat 400 base, thereby drawing the base towards the vehicle anchors 475 until the booster seat is securely attached and the straps 460 are drawn tight.

It may be desirable for each of the attachment ends 462 of the straps 460 to be of equal or substantially equal tension such that each attachment end 462 is attached with the same, or substantially the same force. It may also be desirable to require only a single pulling end 464 to be pulled to achieve the substantially equal force between the two attachment ends 462.

Figure 3:
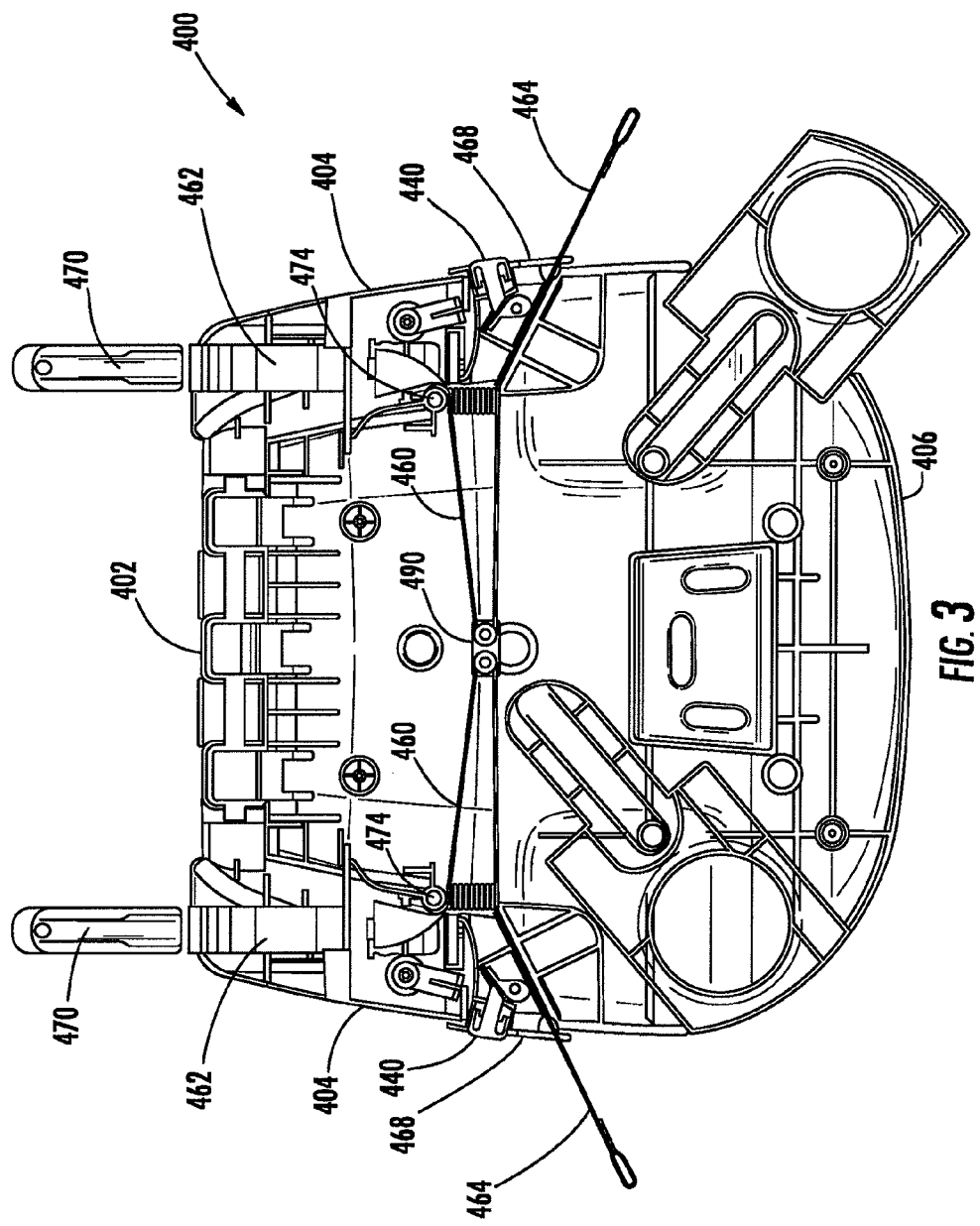
FIG. 3 illustrates an attachment system for securing a child safety seat to a vehicle according to an example embodiment of the present invention.

Embodiments of the present invention may include a system for balancing the tension or pulling force applied to a single pulling end 464 of a strap 460 across both straps 460 resulting in equal tension at the attachment ends 462. The term tension, as used herein, is equated with the pulling force applied to the pulling ends 464. For example, a pulling force of 100 lbs produces a tension of 100 lbs on the strap, provided the attachment end 462 of the strap 460 is held fixed. Embodiments may also balance the tension or pulling force applied to both pulling ends 464 of the straps 460 such that both attachment ends 462 are secured with equal tension. FIG. 3 illustrates an example embodiment of a system for balancing the tension on the attachment ends 462 that may be incorporated into the booster seat base 400 of FIG. 2 as viewed from the bottom. A similar embodiment of the system may be incorporated into a variety of child safety seat embodiments. The attachment ends 462 of the straps 460 extend outside of the back 402 of the booster seat 400. From the attachment ends 462, the straps 460 extend through a cavity defined by the base, each along a strap path, through a balancing assembly 490, and towards the opposing sides 404 of the booster seat 400. The pulling ends 464 of the straps 460 each extend outside of the base through the opposing sides 404 of the booster seat 400 through locking members 468.

Figure 4:
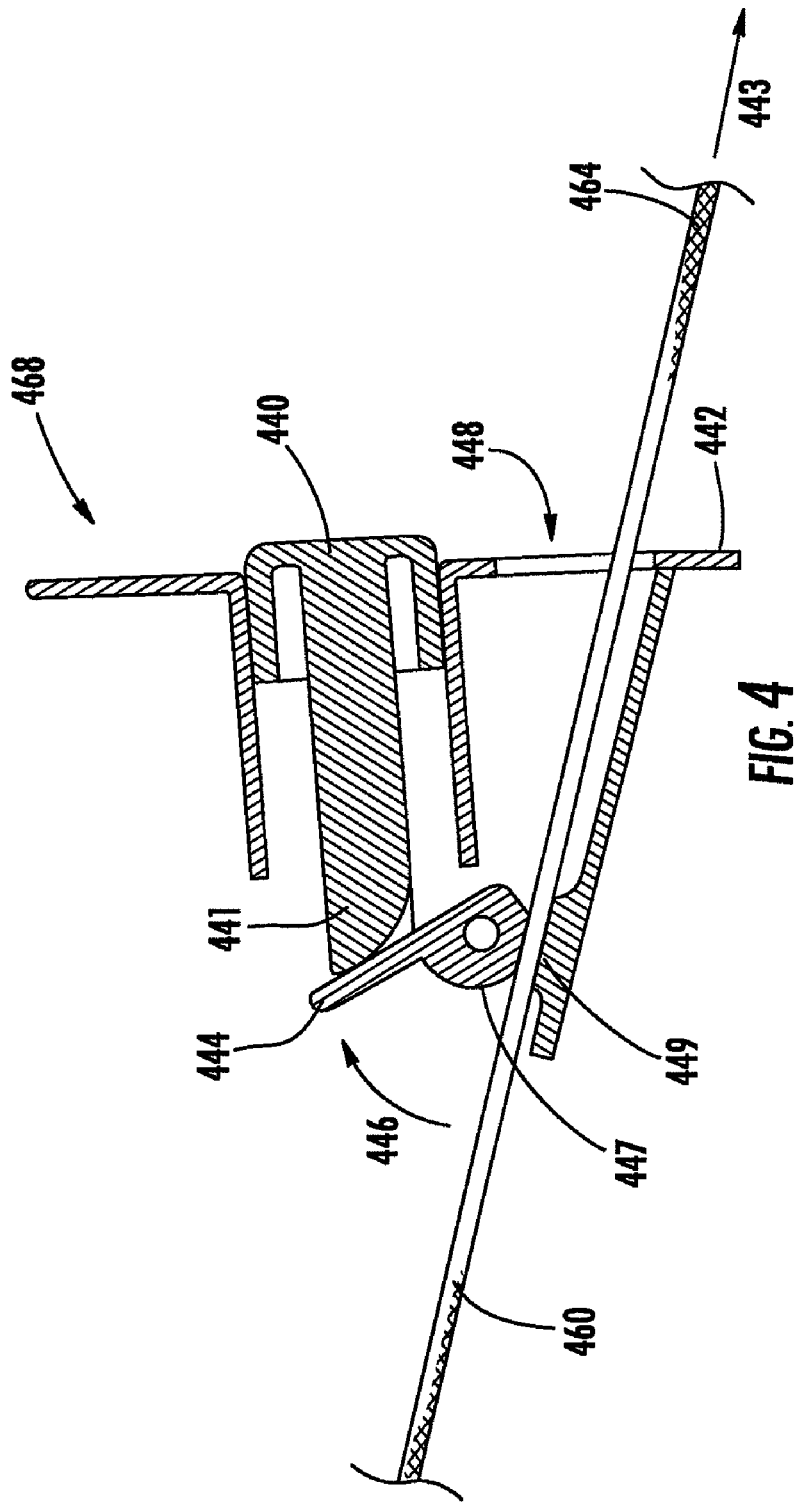
FIG. 4 is an illustration of a cross-section view of a locking mechanism according to an example embodiments of the present invention.

The locking members 468 of FIG. 3 are shown in further detail in FIG. 4. The locking member 468 consists of a housing 442 which is mounted into a side 404 of the booster seat 400. The housing includes an aperture 448 through which the strap 460 passes, with the pulling end 464 of the strap 460 outside of the booster seat 400 base. The locking member 468 may further comprise a button 440 that is arranged to be accessible to a user installing or removing the booster seat 400 from a vehicle. While the release mechanism depicted is a button, any known release mechanism may be employed. The button may include a driving portion 441 at least in partial engagement with a cam member 444. The cam member 444 may include a locking surface 447 and may be biased in the direction of arrow 446, which biases the locking surface 447 into engagement with the strap 460. The cam member 444 may be biased by a clock spring or other such biasing element (not shown). The biasing element may also serve to bias the button outwardly from the base 400 or the button may include a separate biasing element. The locking mechanism of FIG. 4 is shown in the locked position with the strap 460 held between the locking surface 447 of the cam member 444 and the locking surface 449 of the housing 442. The cam member 444 is arranged such that the strap 460 can be moved by a pulling force in the direction of arrow 443 when the cam member 444 is engaged with the strap 460 and the locking mechanism 468 is in the locked position. The cam member 444 is further arranged such that the strap cannot be moved by a pulling force in the direction opposite of arrow 443 when the locking mechanism 468 is in the locked position. A user may depress button 440 thereby moving the locking mechanism 468 from the locked position to the unlocked position. In the unlocked position, the driving portion 441 of the button 440 engages and presses on a portion of the cam member 444, disengaging the locking surface 447 from the strap 460. In the unlocked position, the locking mechanism 468 may permit movement of the strap 460 by a pulling force in either the direction of arrow 443, or the direction opposite 443. The various components of the locking member 468 may be made of a number of materials, but are preferably a durable, hard plastic such as high-density polyethylene and/or metal, such as aluminum.

The strap path of FIG. 3 is illustrated in FIG. 5A in which the booster seat base has been omitted for clarity, as well as the detail of the locking members 468. Each strap 460 has at the attachment end 462 a connector 470 for attaching to an anchor in a vehicle. Attachment ends 462 of the straps 460 extend from the connectors 470, into the booster seat base proximate lines 472 provided only for reference. The aperture through which the straps 460 enter the base may be configured to preclude the attachment ends 462 of the straps from twisting. The straps 460 continue through the booster seat base at least partially around bends 474. The surfaces at bends 474 at which the straps 460 make contact are preferably smooth and of a relatively durable, low friction surface to provide for smooth movement of the straps 460 as they move over and around the bends 474. The bends 474 may also cause a transition of the orientation of the straps 460. In the illustrated embodiment, the straps 460 enter the base through apertures at 472 that retain the straps 460 in an orientation relatively flat with respect to the bottom of the booster seat 400. As the straps 460 approach the bends 474, the straps are turned 90 degrees for orientation within the balancing assembly 490. Each strap passes through the balancing assembly 490 and makes a bend of approximately 170 degrees through the balancing assembly 490. The balancing assembly 490 is not in a fixed location, but is held in place only by the straps 460. The straps 460 exit the balancing assembly 490 directed toward opposing sides 404 of the booster seat 400. The straps 460 may pass over another bend 476 as the straps 460 transition toward the locking members 468. Surfaces that the straps may contact during normal use are preferably smooth, low friction surfaces to reduce the amount of force lost to friction when the pulling ends 462 of the straps 460 are pulled, as well as to reduce wear on the straps 460.

Figure 6:
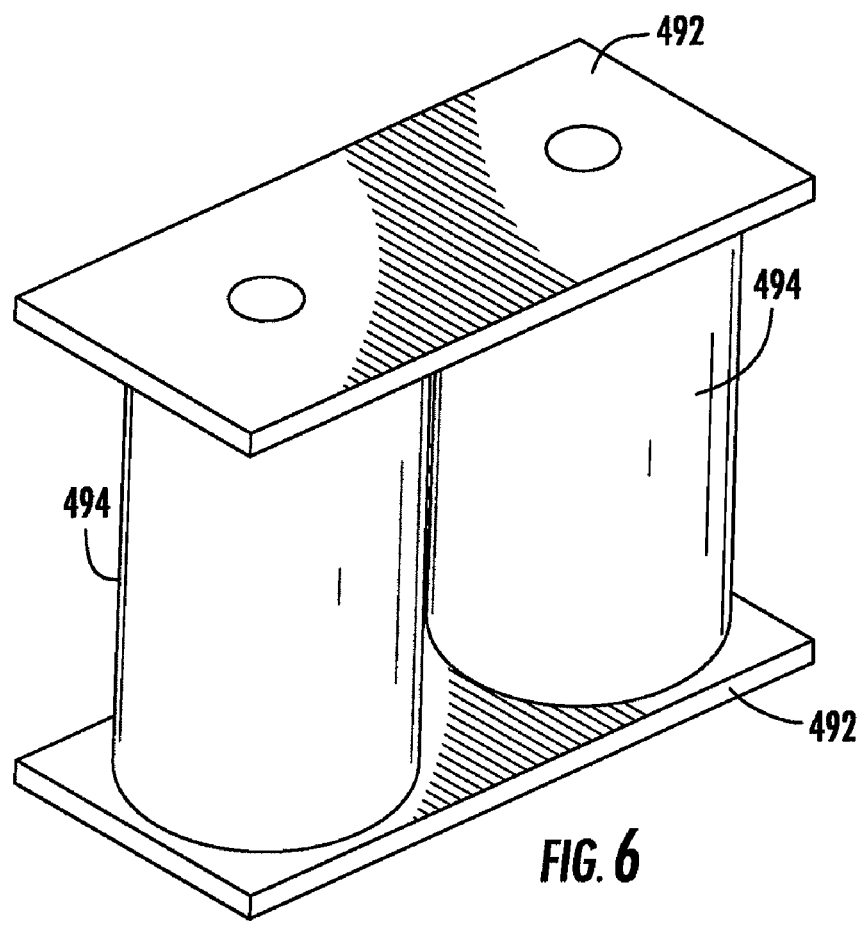
FIG. 6 illustrates an example embodiment of a balancing assembly according to the present invention.

An example embodiment of the balancing assembly 490 is depicted in detail in FIG. 6. The balancing assembly consists of four portions including two end plates 492 and two transition portions 494 disposed therebetween. The balancing assembly 490 may be made of a single piece of durable hard plastic or metal, or the balancing assembly may be made of several pieces of potentially different materials. The transition portions 494 may be made of metal or a metal sheathed plastic to provide additional wear resistance. The transition portions 494 may be roller bearings with shafts held in place by the end plates 492. The end plates 492 may similarly be made from different materials such as plastics or metals. The balancing assembly 490 may provide a relatively smooth, wear resistant transition for the strap 460 as the strap wind around approximately 170 degrees of the surface of each transition portion 494. The material and size of the end plates 492 and the transition portions 494 are preferably selected to not fail under significant pulling forces applied to the strap.

Figure 7:
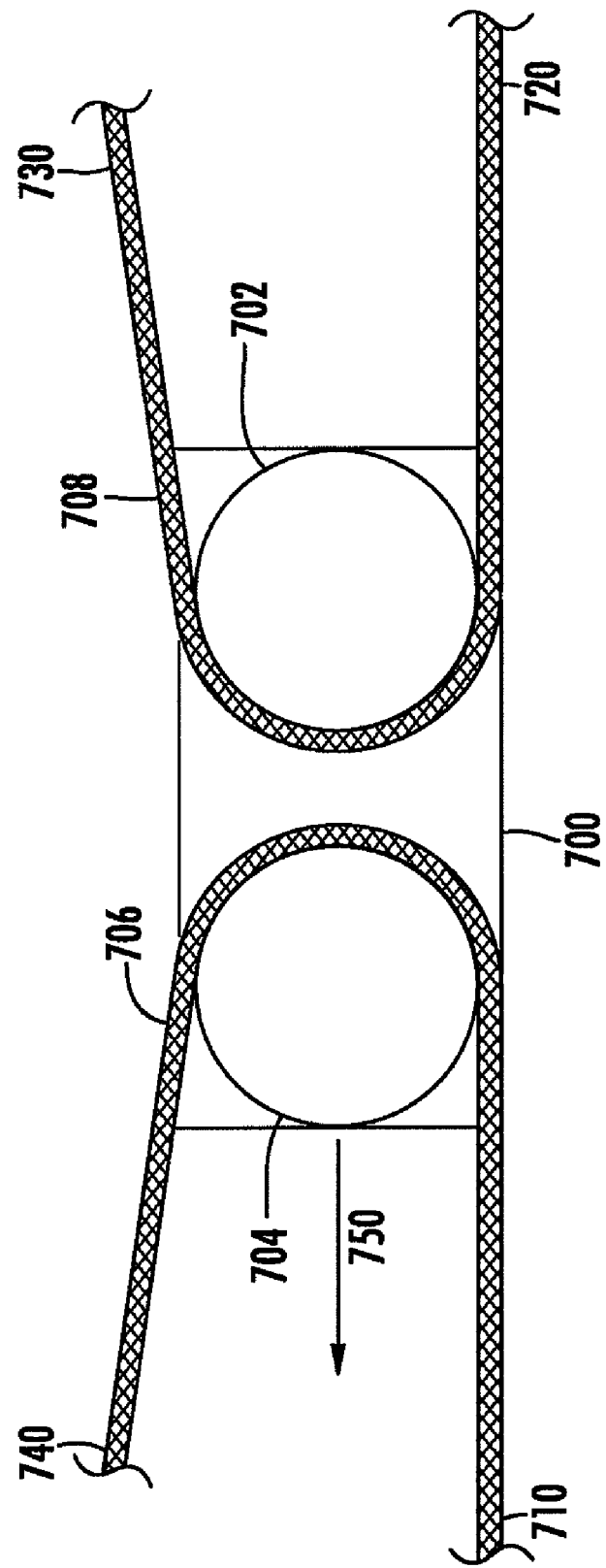
FIG. 7 is an illustration of a balancing assembly and straps according to an example embodiment of the present invention.

In operation, embodiments of the present invention provide for a substantially equal tension to be applied to each of the attachment ends 462 when either or both of the pulling ends 464 are pulled. The balancing assembly 490 of embodiments of the present invention balance a pulling force across both attachment straps 460 to provide a more even and secure installation. FIG. 7 illustrates an example embodiment of a balancing assembly 700 including transition portions 702 and 704. Two straps 706 and 708 extend around a respective transition portion 704 and 702. It is noted that the balancing assembly 700 is not in a fixed location, but is movable. As any one of the strap ends 710, 720, 730, or 740 is pulled, each of the other three ends experience the same force as one another. For example, if pulling end 710 is pulled with a tension of 100 lbs, corresponding attachment end 740 has a tension of 100 lbs as it is the same attachment strap 706. The balancing assembly 700 sees a force of 200 lbs in the direction of arrow 750. Pulling end 720, which may be locked in position by a locking member and attachment end 730 must provide an equal and opposite force to the 200 lbs exerted on the balancing assembly 700 by 710 and 740. As 720 and 730 are both ends of a single attachment strap 708, they equally divide the 200 lb force and thus each is under 100 lbs of tension. In operation, should any of the four ends (710, 720, 730, or 740) have more slack than the others, (e.g., if less tension is being carried by any of those ends), the balancing assembly 700 moves within the base, side-to-side between bends 474 of FIG. 3 to balance the tension in each end. Thus, when either of the pulling ends (710, 720) of the straps (708, 706) is pulled, an equal tension is applied to the attachment ends (730, 740) of each.

Referring back to FIGS. 5A and 5B, the side-to-side motion of the balancing assembly 490 disposed within the base 400 is configured such that the forces exerted on the straps 460 are equal even when the excess strap length or slack of one of the straps 460, is not equal between the straps 460. For example, FIG. 5A depicts the balancing assembly 490 and the straps 460 disposed in a substantially symmetrical position about centerline 99. FIG. 5B depicts the balancing assembly 490 shifted to the right of the centerline 99 in response to pulling end 464A being pulled through locking member 468A and creating increased tension on both straps 460A, 460B. While the slack from strap 460A is taken up by pulling end 464A being drawn out of the base through the locking member 468A, the slack from strap 460B is taken up by the balancing assembly 490 shifting to the right of the centerline 99.

In an embodiment of the present invention where both pulling ends 710, 720 of the attachment straps 706, 708 are pulled at the same time, the pulling end 710, 720 that is pulled with a higher pulling force dictates the tension applied to the attachment straps 706, 708. The locking members illustrated in FIG. 4, when in a locked position, allow a strap to be pulled only in the direction of arrow 443 and hold the attachment strap in a fixed position when pulled in a direction opposite arrow 443. Thus, when the pulling force applied to either pulling end 710 or 720 exceeds the pulling force of the other pulling end 710 or 720, the pulling end with the superior pulling force is dictating the tension applied. For example, if pulling end 710 is pulled with 100 lbs of force and pulling end 720 is pulled with 150 lbs of force, the tension applied to 710 would be greater in the direction towards the balancing assembly (i.e. opposite arrow 443 of FIG. 4) than in the direction pulling end 710 is being pulled. The locking member would preclude pulling end 710 from being drawn into the base such that the pulling force applied to pulling end 710 is rendered moot and the tension applied to the attachment straps 706, 708 would be 150 lbs.

Another example of the embodiment of FIG. 7 in operation may include when one of the attachment ends 730 or 740 has significantly more excess slack than the other. In such a case, the attachment ends could first be secured to the anchor points of the vehicle for installation of the child safety seat. Upon application of a pulling force to either of the pulling ends 710 or 720, the slack from each of the attachment ends 730 and 740 would be initially taken up by the pulling of the pulling end through the locking member. Once the slack is substantially taken out of one of the attachment ends 730 or 740, the tension required to draw that strap in further to the base would exceed that of the other, such that the slack in the other end would be removed until the tension required to draw both straps into the base is substantially equal and further tension can be applied to both attachment ends 730 and 740.

Referring back to FIG. 3, in preferred embodiments of the present invention, the balancing assembly 490 will remain between bends 474. The lengths of the straps 460 may be determined such that upon full extension (the attachment end of one strap is pulled out as far from the base as possible while the other attachment end and the pulling ends are drawn in as close to the base as possible), the balancing assembly 490 remains between bends 474. Further, with the pulling ends in full extension (one pulling end is drawn out as far as possible from the base while the other pulling end and both attachment ends are drawn into the base as much as possible), the balancing assembly 490 remains between the bends 474. Keeping the balancing assembly 490 between the bends 474 reduces the possibility of the straps 460 binding or twisting within the cavity of the base. The cavity in the base in which the balancing assembly 490 is disposed may be inaccessible to a user such that there is a lower likelihood of any tangling or obstruction of the straps.

Figure 8:
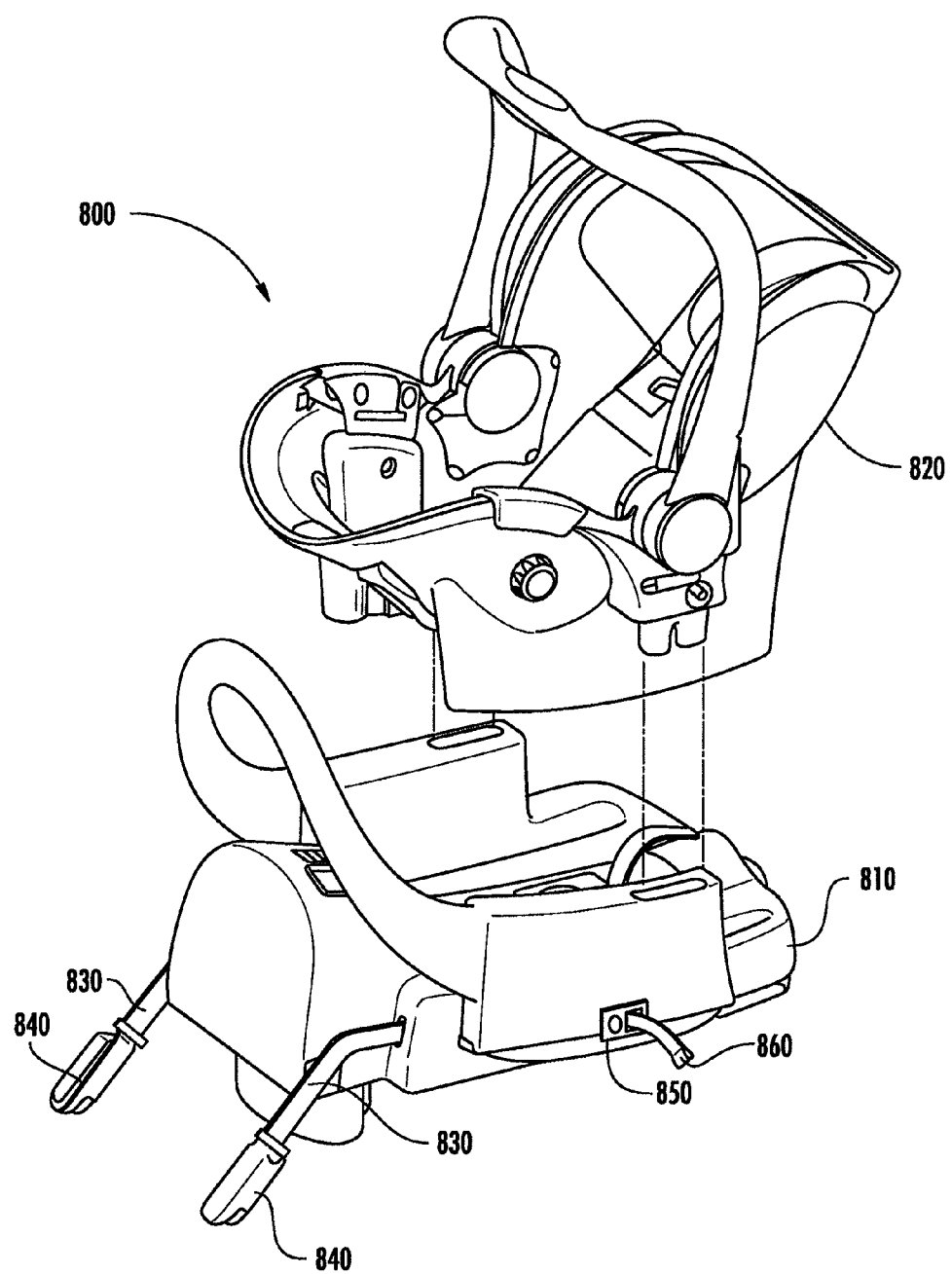
FIG. 8 illustrates an example embodiment of the present invention as embodied on the base of infant carrier system child safety seat.

While example embodiments of the invention have been described herein with respect to an attachment system for use with a booster seat embodiment of a child safety seat, embodiments of the invention may be used with any child safety seat such as convertible car seats or in the base of an infant carrier car seat system as illustrated in FIG. 8. The illustrated embodiment depicts an infant carrier car seat system 800 including a base 810 and an infant carrier 820 structured for secure attachment to the base 810. The base 810 includes straps with attachment ends 830 attached to LATCH-type connectors 840. The straps further include a pulling end 860 exiting the base 810 through locking members 850.

Figure 9:
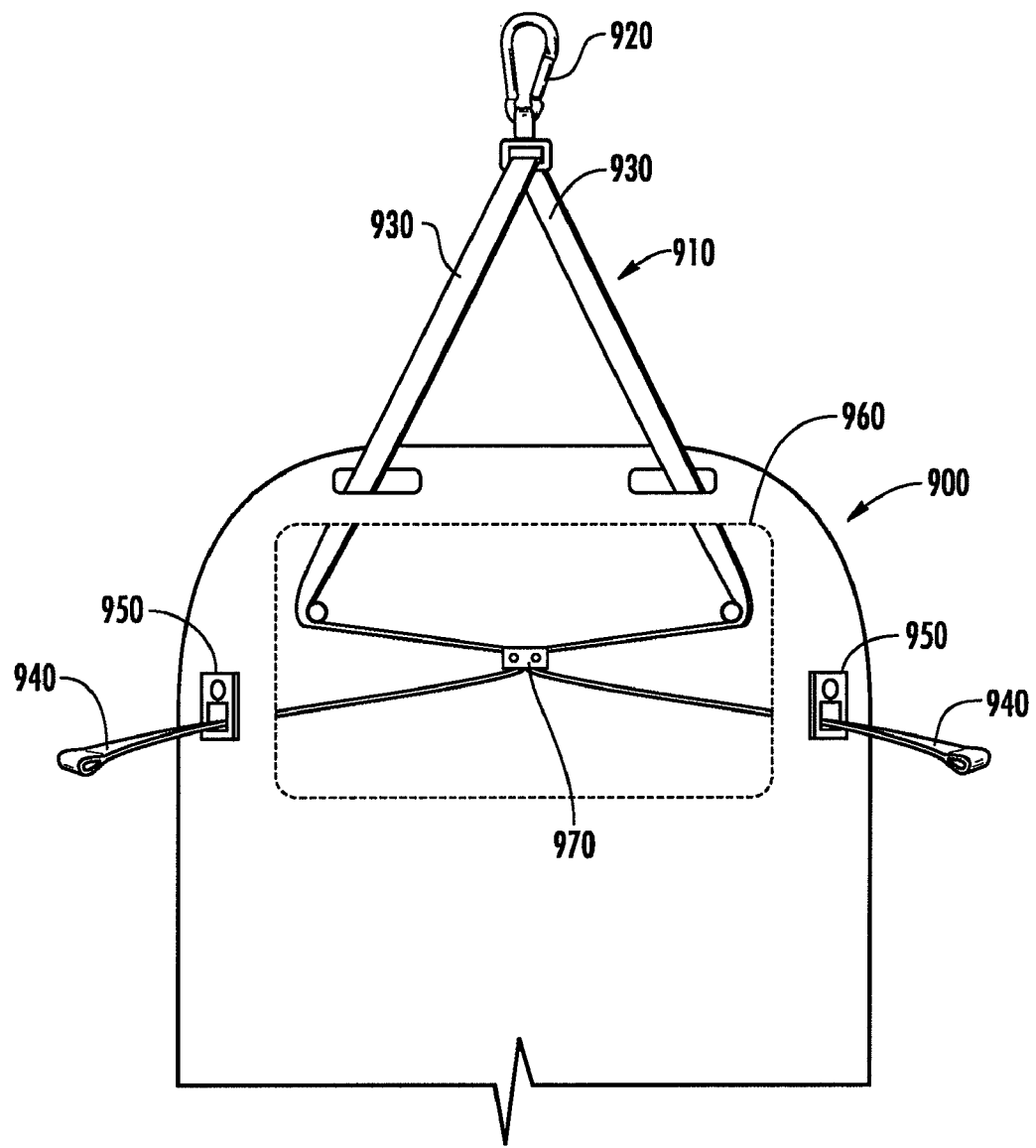
FIG. 9 illustrates an example embodiment of the present invention as embodied for a tether system of a child safety seat.

Further embodiments of the present invention may provide an attachment means for securing a tether, such as tethers used in the LATCH system. An example embodiment of such a system is illustrated in FIG. 9 which depicts a child safety seat, such as a convertible car seat 900, as viewed from the back of the child safety seat. The tether 910 may include a LATCH connector 920 which is disposed at the ends of the attachment ends 930 of the strap or possibly with the attachment ends 930 being a single, continuous strap threaded through the LATCH connector 920 as shown. The pulling ends 940 extend out of the back of the child safety seat 900 through locking members 950. A cut-out 960 is illustrated to more clearly illustrate how an embodiment of the present invention may be arranged within the back of a child safety seat. The strap path illustrated is essentially similar to the strap path depicted in FIGS. 3 and 5A with the balancing assembly 970 in the middle. A pulling force applied to either pulling end 940 would result in the slack being removed from the attachment ends 930 and an even tension force being applied to both attachment ends 930.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A safety seat comprising:
   a base defining a cavity therein;
   a first strap and a second strap, wherein the first strap and the second strap each include a pulling end and an attachment end; and
   a balancer assembly disposed within the cavity, wherein each of the first and second straps pass through the balancer assembly, and wherein a pulling force applied to the pulling end of either of the first strap or the second strap results in a force on the attachment ends of both of the first and second strap that is substantially equal.

2. The safety seat according to claim 1, wherein the base includes a front, a back, and two opposing sides disposed there between, wherein the attachment ends of both of the first strap and the second strap exit the base proximate the back.

3. The safety seat according to claim 2, wherein the pulling ends of each of the first strap and the second strap exit the base through the opposing sides.

4. The safety seat according to claim 3, further comprising first and second locking members disposed proximate the location where the pulling ends of each of the first strap and the second strap exit the base respectively.

5. The safety seat according to claim 4, wherein the first and second locking members each define a locked position and an unlocked position, wherein in the locked position the first and second straps may be pulled through the locking members by a pulling force applied to the pulling end of the first and second straps, and wherein the straps are prevented from being pulled through the locking members by a pulling force applied to the attachment ends of the first and second straps.

6. The safety seat according to claim 5, wherein when either of the first or second locking members are in the unlocked position, the first or second strap may be pulled through the respective locking member by a pulling force applied to either the pulling end of the respective strap, or either of the attachment ends.

7. The safety seat according to claim 6, wherein each of the first and second locking members are biased in the locked position and each of the locking members are configured to be moved to the unlocked position in response to actuation of a release mechanism of the respective locking member.

8. The safety seat according to claim 7, wherein the safety seat includes storage recesses configured to receive the first and second connectors when the connectors are not attached to anchor points on a vehicle.

9. The safety seat according to claim 1, wherein the attachment ends of each of the first and second straps are configured with a connector configured to attach to an anchor point on a vehicle.

10. The safety seat according to claim 1, wherein when a first pulling force is applied to the pulling end of the first strap and a second pulling force is applied to the pulling end of the second strap, the force applied to the attachment ends of both of the first and second strap is substantially equal to the greater of the first pulling force and the second pulling force.

11. A safety seat comprising:
    first and second straps, each including a pulling end and an attachment end, wherein a connector is attached to each attachment end, each connector configured to attach to an anchor point on a vehicle;
    a base through which the first and second straps pass, wherein the pulling ends of each of the first and second straps extend beyond the base and wherein the attachment ends of each of the first and second straps extend beyond the base; and
    a balancer assembly disposed within the base, through which both of the first and second straps pass, wherein in response to a the pulling end of either of the first strap or the second strap being drawn out of the base, the attachment ends of both of the first strap and the second strap are drawn into the base.

12. The safety seat according to claim 11, wherein the base includes a front, a back, and two opposing sides disposed therebetween, wherein the attachment ends of both of the first strap and the second strap exit from the base proximate the back.

13. The safety seat according to claim 12, wherein the pulling ends of the first strap and the second strap exit the base through the opposing sides respectively.

14. The safety seat according to claim 13, further comprising first and second locking members disposed proximate the location where the pulling ends of the first strap and the second strap exit the base.

15. The safety seat of claim 14, wherein the first and second locking members each define a locked position and an unlocked position, wherein in the locked position, the first and second straps may be pulled through the locking members by a pulling force applied to the pulling end of the first and second straps, and wherein the straps are prevented from being pulled through the locking members by a pulling force applied to the attachment ends of each of the straps.

16. The safety seat of claim 15, wherein when the first or second locking member is in the unlocked position, the respective first or second strap may be pulled through the respective locking member by a pulling force applied to the respective pulling end or either of the attachment ends.

17. The safety seat of claim 16, further comprising storage means disposed within the base configured to accept the first and second connectors when the first and second connectors are not attached to anchor points on a vehicle.

18. A method of securing a safety seat to a vehicle comprising:

attaching connectors of attachment ends of attachment straps to anchor points on the vehicle wherein each attachment strap comprises a pulling end and an attachment end; and pulling at least one of the pulling ends of the attachment straps with a tension force; balancing the tension force across the attachment ends such that each of the attachment ends has a substantially equal tension force.

19. The method of claim 18, wherein the balancing is achieved with a balancing assembly.

20. The method of claim 18, further comprising maintaining the tension force in the attachment straps with locking members configured to engage each attachment strap respectively, proximate the pulling end.

* * * * *